Patented Sept. 12, 1950

2,521,856

UNITED STATES PATENT OFFICE 2,521,856

ANTIOXIDANT

Henry R. Kraybill and Buell W. Beadle, Chicago, Ill., assignors to A. W. Brickman, Victor Conquest, Frank J. Madden, Wrisley B. Oleson, and Emery T. Filbey, as trustees No Drawing. Application July 26, 1947, Serial No. 764,016

6 Claims. (Cl. 99—163)

The present invention relates, generally, to the stabilization of materials normally subject to oxidative rancidity due to their content of glycerides of fatty acids. More particularly, the invention relates to new and useful antioxidant compositions which are highly effective in small concentrations, in the order of a small fraction of a per cent, to impart both long shelf-life and good "carry through" to materials subject to oxidative rancidity, such as animal and vegetable fats and oils, and products made therewith.

A number of antioxidant compositions have been proposed for stabilizing animal and vegetable fats and oils. Some of these compositions consist of a single substance while others contain a mixture of ingredients. Although some of these previous antioxidant compositions may impart satisfactory shelf-life and others may impart reasonably good "carry-through," we are not aware of any that impart both a high shelf-life and a good "carry-through."

Shelf-life is a measure of the ability of an antioxidant to stabilize animal and vegetable fats and oils and products containing them, when held in storage. Fats frequently need to be stabilized if they are to be stored for considerable periods of time before use. In the investigation and testing of antioxidant compositions, shelf-life is usually determined by accelerated test techniques which usually give indications of actual shelf-life as determined by actual storing at standard normal conditions. There are two types of recognized accelerated tests for shelf-life which are commonly employed. One is the Active Oxygen Method (usually designated by the abbreviation A. O. M.) and the other is the Schaal Oven Test. Both of these testing techniques are described in the literature and are familiar to those skilled in the art.

"Carry-through" is an expression commonly used to designate the measure of the ability of an antioxidant to continue to impart stability to a fatty material after the material has been altered by use in cooking or otherwise. Thus, an antioxidant may impart a high shelf-life to lard, but when the lard is used in frying or pastry-making the antioxidant may impart little or no stability to the altered lard. Such an antioxidant would be characterized as having poor "carry-through." On the other hand antioxidants are known which will give only a low shelf-life to a fatty material such as lard, yet these antioxidants may have a relatively high "carry-through" when the lard is altered by cooking or frying.

"Carry-through" may be measured by the Active Oxygen Method or the Schaal Oven Test.

In addition to imparting both long shelf-life and high "carry-through," an antioxidant for animal and vegetable fats and oils should meet other requirements, particularly where the fats and oils are edible. These additional requirements may be listed as follows:

1. Should not be toxic in effective stabilizing concentrations.
2. Should not impart color or odor to the material stabilized.
3. Should not affect the taste of the material stabilized.
4. Should be effective in minute concentrations, i. e., in the order of a small fraction of a per cent.
5. Should be soluble in, and remain uniformly distributed throughout, the material stabilized.
6. Should be available in quantity at reasonable cost.
7. Should be available in high purity and uniform quality.

It will be apparent that the foregoing requirements for a food type of antioxidant are much more drastic and numerous than are the requirements for an antioxidant for non-edible materials such as rubber or gasolene.

The object of this invention, generally stated, is the provision of antioxidant compositions for materials normally subject to oxidative rancidity, which besides meeting all of the usual requirements for a food antioxidant, also impart to such materials both long shelf-life and high "carry through." The antioxidant compositions provided by this invention are particularly useful in stabilizing lard, although they are also effective in stabilizing animal and vegetable fats and oils, generally.

Certain other objects of the invention will, in part, be obvious, and will in part appear hereinafter.

For a more complete understanding of the nature and scope of the invention, reference may be had to the following detailed description thereof wherein a preferred example is given by way of illustration.

We have found that materials subject to oxidative rancidity, such as animal and vegetable fats and oils, and products containing these materials, may be effectively stabilized so as to have both long shelf-life and high "carry-through" by the addition thereto of a minor quantity of an antioxidant containing the following combination of ingredients in proper concentrations and proportions:

(a) Butylated hydroquinone monoalkyl ether wherein the alkyl group contains from 1 to 4 carbon atoms inclusive.

(b) Hydroquinone.

(c) An acidic material selected from the group consisting of citric acid, ascorbic acid (vitamin C) oxalic acid, phosphoric acid, ethyl acid phosphate, and triethyl phosphate.

The butylated hydroquinone monoalkyl ether may be a mixture of the ortho and meta isomers as obtained by butylating a hydroquinone monoalkyl ether wherein the alkyl group has from 1 to 4 carbon atoms. The ingredients should be of high purity, particularly when the antioxidant compositions are to be used in stabilizing food products.

The following example illustrates a preferred embodiment of the invention.

Example 1

Fresh, steam rendered, lard was stabilized by uniformly distributing therethrough the following antioxidant composition in the concentration indicated.

|  | Concentration, percent by weight |
|---|---|
| Butylated hydroquinone monomethyl ether | 0.01 |
| Hydroquinone | 0.003 |
| Phosphoric acid | 0.002 |
|  | 0.015 |

The particular manner in which the antioxidant composition is added to the lard is not critical. One convenient way of making the addition is to mix the total amount of the antioxidant composition with a small portion of the lard and then uniformly blend this portion with the balance of the lard. However, the antioxidant composition may be added directly to the full amount of the lard, or the individual ingredients of the antioxidant composition may be separately added. Other techniques will be obvious to those skilled in the art. The antioxidant composition may be similarly added to other animal and vegetable fats and oils in approximately the same proportions and concentrations.

The shelf-life of the stabilized lard of Example 1 was determined both by the Active Oxygen Method and by the Schaal Oven Test (at 145° F.). The stability of the lard by the Active Oxygen Method was 78 hours, and by the Schaal Oven Test was 82 days. At the same time controls were run on the lard with no addition of the antioxidant composition. The stability of the control lard by the Active Oxygen Method was 5 hours, and by the Schaal Oven Test was 4 days.

At the present time, a stability of 75 hours as determined by the Active Oxygen Method or 82 days by the Schaal Oven Test, is considered to indicate a shelf-life of oustandingly good length.

Both the stabilized lard of Example 1 and the untreated lard control were used for frying potato chips and in making pastries, and the "carry-through" ability of the antioxidant composition was determined. After the stabilized lard and the untreated control had been used for five successive fryings of potato chips their stabilities were checked by the Active Oxygen Method. The stabilized lard so used was found to have a stability of 19 hours while the control used in the same way had a stability of one-half hour.

Potato chips and pastry made from the stabilized lard of Example 1 and from the untreated control lard were tested for stability by the Schaal Oven Test at 145° F. The potato chips made from the stabilized lard had a stability of 460 hours, while those made from the untreated control lard had a stability of 42 hours. The pastry made from the stabilized lard had a stability of 438 hours while the pastry made from the untreated control lard had a stability of 48 hours.

In Example 1 the preferred range of the concentration of the butylated hydroquinone monomethyl ether is from 0.01% to 0.02%. We prefer to use the tertiary butyl products. The preferred range of the concentration of the hydroquinone is from 0.002% to 0.005%, and the preferred range of the concentration of the phosphoric acid is from 0.002% to 0.005%.

The butylated hydroquinone monomethyl ether may be replaced with equivalent concentrations of one of the lower alkyl ethers having from 1 to 4 carbon atoms. Thus, the ethyl, propyl, iso propyl or n-butyl ethers may be used.

The phosphoric acid in Example 1 may be replaced with equivalent concentrations of citric acid, ascorbic acid, ethyl acid phosphate, or triethyl phosphate. Ethyl acid phosphate and triethyl phosphate are advantageous substitutes for the phosphoric acid since they are cheap and highly fat soluble.

What is claimed as new is:

1. A material normally subject to the deteriorating effect of oxidative rancidity due to its content of glycerides of fatty acids, stabilized by the presence of (a) from .01 to .02% by weight based on the glyceride content of teritary butylated hydroquinone monoalkyl ether wherein the alkyl group contains from 1 to 4 carbon atoms inclusive; (b) from .002 to .005% by weight of hydroquinone, (c) from .002 to .005% by weight of an acidic material selected from the group consisting of citric acid, ascorbic acid, oxalic acid, phosphoric acid, ethyl acid phosphate and triethyl phosphate.

2. A material normally subject to the deteriorating effect of oxidative rancidity due to its content of glycerides of fatty acids, stabilized by the presence of (a) from .01 to .02% by weight based on the glyceride content of tertiary butylated hydroquinone monomethyl ether, (b) from .002 to .005% by weight of hydroquinone, (c) from .002 to .005% by weight of an acidic material selected from the group consisting of citric acid, ascorbic acid, oxalic acid, phosphoric acid, ethyl acid phosphate and triethyl phosphate.

3. Lard stabilized by the presence of each of the following, (a) from .01 to .02% by weight based on the glyceride content of tertiary butylated hydroquinone monoalkyl ether wherein the alkyl group contains from 1 to 4 carbon atoms inclusive (b) from .002 to .005% by weight of hydroquinone, (c) from .002 to .005% by weight of an acidic material selected from the group consisting of citric acid, ascorbic acid, oxalic acid, phosphoric acid, ethyl acid phosphate and triethyl phosphate.

4. Lard stabilized by the presence of each of the following (a) from .01 to .02% by weight based on the glyceride content of tertiary butylated hydroquinone monomethyl ether, (b) from .002 to .005% by weight of hydroquinone, (c) from .002 to .005% by weight of an acidic material selected from the group consisting of citric acid, ascorbic acid, oxalic acid, phosphoric acid, ethyl acid phosphate and triethyl phosphate.

5. Fatty acid glycerides stabilized by the presence of each of the following (a) from .01 to .02% by weight of tertiary butylated hydroquinone monomethyl ether, (b) from .002 to .005% by weight of hydroquinone, (c) from .002 to .005% by weight of an acidic material selected from a group consisting of citric acid, ascorbic acid, oxalic acid, phosphoric acid, ethyl acid phosphate and triethyl phosphate.

6. A fatty acid glyceride stabilized by the presence of each of the following (a) from .01 to .02% by weight of tertiary butylated hydroquinone monomethyl ether, (b) from .002 to .005% by weight of hydroquinone, (c) from .002 to .005% by weight of phosphoric acid.

HENRY R. KRAYBILL.
BUELL W. BEADLE.

REFERENCES CITED

The following references are of record in the file of this patent:

UNITED STATES PATENTS

| Number | Name | Date |
|---|---|---|
| 2,050,689 | Briod | Aug. 11, 1936 |
| 2,138,924 | Jones | Dec. 6, 1938 |
| 2,333,656 | Mattill et al. | Nov. 9, 1943 |